US007039396B2

(12) United States Patent
Nishi et al.

(10) Patent No.: US 7,039,396 B2
(45) Date of Patent: May 2, 2006

(54) RECEIVER FOR RECEIVING ATTRIBUTE INFORMATION OF THE PROGRAM

(75) Inventors: Hiroyuki Nishi, Tokyo (JP); Yasuo Endo, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 776 days.

(21) Appl. No.: 09/913,360

(22) PCT Filed: Dec. 13, 2000

(86) PCT No.: PCT/JP00/08823

§ 371 (c)(1),
(2), (4) Date: Oct. 9, 2001

(87) PCT Pub. No.: WO01/45403

PCT Pub. Date: Jun. 21, 2001

(65) Prior Publication Data

US 2002/0137468 A1 Sep. 26, 2002

(30) Foreign Application Priority Data

Dec. 14, 1999 (JP) .................................. 11-355180

(51) Int. Cl.
*H04M 3/00* (2006.01)
*H04B 1/06* (2006.01)

(52) U.S. Cl. ...................................... 455/418; 455/352

(58) Field of Classification Search ................ 455/352, 455/418, 92; 709/217; 370/312, 390; 725/39, 725/86
See application file for complete search history.

(56) References Cited

U.S. PATENT DOCUMENTS

| 5,721,827 A | * | 2/1998 | Logan et al. ................ 709/217 |
| 6,262,721 B1 | | 7/2001 | Tsukidate et al. ........... 715/721 |
| 2004/0233861 A1 | * | 11/2004 | Kawai et al. ................ 370/312 |

FOREIGN PATENT DOCUMENTS

| CN | 1171582 A | 1/1998 |
| JP | 9-312811 | 12/1997 |
| JP | 10-75219 | 3/1998 |
| JP | 11-103450 | 4/1999 |
| JP | 11-196389 | 7/1999 |
| JP | 11-298451 | 10/1999 |

\* cited by examiner

*Primary Examiner*—Benny Quoc Tieu
(74) *Attorney, Agent, or Firm*—Pearne & Gordon LLP

(57) ABSTRACT

The present invention provides a transmitter and a receiver capable of transmitting and receiving attribute information of a program while maintaining a high level of secrecy.

Specifically, a transmitter (100) in a transmission and reception system comprising the transmitter (100) for transmitting program contents (21) and attribution information (22) of the program and a receiver (200) for receiving the program contents (21) and accumulating part or whole of the program contents (21) transmits meaning information (24) indicating the meaning and contents of the attribute information (22) in addition to the attribute information (22).

6 Claims, 14 Drawing Sheets

FIG. 6

MEANING INFORMATION 24

| ADDRESS | VALUE (0) | VALUE (1) | |
|---|---|---|---|
| 0 | FEMALE | MALE | ← 24A |
| 1 | 18 YEARS OF AGE OR OVER | NO AGE LIMITS | ← 24B |
| 2 | | | |
| 3 | | | |

| ADDRESS | VALUE | MEANING | |
|---|---|---|---|
| 4 ~ 7 | 0001 | A COMPANY | ⎫ |
| | 0010 | B COMPANY | ⎪ |
| | 0011 | T COMPANY | ⎬ 24C |
| | ⋮ | ⋮ | ⎪ |
| | 1111 | N COMPANY | ⎭ |

| PROGRAM ID | 0001 | | ← 26 |

FIG. 7

MEANING INFORMATION 29

| ADDRESS | VALUE (0) | VALUE (1) | |
|---|---|---|---|
| 0 | NO AGE LIMITS | 18 YEARS OF AGE OR OVER | ← 29A |

| | 0001 | T COMPANY | ⎫ |
|---|---|---|---|
| | 0010 | A COMPANY | ⎪ |
| 1 ~ 4 | 0011 | N COMPANY | ⎬ 29B |
| | ⋮ | ⋮ | ⎪ |
| | 1111 | B COMPANY | ⎭ |

| ADDRESS | VALUE (0) | VALUE (1) | |
|---|---|---|---|
| 5 | FEMALE | MALE | ← 29C |
| 6 | | | |
| 7 | | | |

| PROGRAM ID | 0001 | | ← 26 |

RECEIVER FOR RECEIVING ATTRIBUTE INFORMATION OF THE PROGRAM

TECHNICAL FIELD

The present invention relates to a transmitter and a receiver and, more particularly, to a transmitter which transmits a program and attribute information of the program and a receiver which receives the program and accumulates part or whole of the program.

BACKGROUND ART

Transmission and reception systems are known which comprise a transmitter for transmitting program and attribute information of the program and a receiver for receiving the program and attribute information transmitted by the transmitter and for accumulating part of or whole of the program.

In the transmission and reception system, the attribute information of a program transmitted by the transmitter is information indicating the type of information provided by the transmitter to users.

A high level of secrecy is required for attribute information indicating the type of information provided by the transmitter to users because a broadcast can be received by anybody.

For this reason, when attribute information for which secrecy is a must is to be transmitted to each receiver, the transmitter transmits attribute information which has been coded according to a predetermined coding system to the receiver.

Only receivers having a key to decode the codes can decode the coded attribute information transmitted by the transmitter.

However, there is no guarantee that a coding system will be permanently safe after it is once decided because of recent advances of decoding techniques. A reduction of the safety of a coding system necessitates replacement of IC cards of all receivers.

When a plurality of receivers employ different coding systems, the size of a decoding program in the receivers increases; processes in the program become complicated; and the hardware configuration of the receiver also becomes complicated.

It is an object of the invention to provide a transmitter and a receiver capable of transmitting and receiving attribute information of a program while maintaining a high level of secrecy in a simple hardware configuration without using a coding system.

DISCLOSURE OF THE INVENTION

A transmitter according to the invention is a transmitter in a transmission and reception system comprising a transmitter for transmitting a program and attribute information of the program and a receiver for receiving the program and accumulating part or whole of the program, the transmitter transmitting meaning information indicating the meaning and contents of the attribute information in addition to the program and the attribute information to achieve the above-described object.

A program for executing the function of accumulating part or whole of the program may be further transmitted.

Further, the time of distribution of the program may be transmitted.

A receiver according to the invention has a receiving section for receiving a program, attribute information, and meaning information, a user attribute storing section for storing user attributes that are the attributes of a viewer, and accumulation control section for accumulating part or whole of the program according to the attribute information that is interpreted based on the meaning information and the user attributes, whereby the above-described object is achieved.

A separating section for separating the program received by the receiving section, the attribute information, and meaning information may be further provided.

An accumulation control function receiving section for receiving a program for executing the function of accumulating part or whole of the program may be further provided, and the accumulation control section may operate based on the program received by the accumulation control function receiving section.

The means of the accumulation control function receiving section for receiving the program may be means for receiving a broadcast, and there may be further provided a determining section for determining whether the accumulation control function receiving section has failed to receive the program from said broadcast or not and an accumulation control function acquiring section for acquiring the program through a network when the determining section determines that the reception has failed.

A distribution time receiving section for receiving the time of distribution of the program may be further provided, and the receiving operation of the accumulation control function receiving section may be performed at a point in time associated with the time of distribution.

A method of transmission according to the invention is a method of transmission in a transmission and reception system comprising a transmitter for transmitting a program and attribute information of the program and a receiver for receiving the program and accumulating part or whole of the program, the method including a step of transmitting the program, a step of transmitting the attribute information, and a step of transmitting meaning information indicating the meaning and contents of the attribute information to achieve the above-described object.

It may further include a step of transmitting a program for executing the function of accumulating part or whole of the program.

It may further include a step of transmitting the time of distribution of the program.

A method of reception according to the invention includes a step of receiving a program, attribute information, and meaning information, a step of acquiring user attributes that are the attributes of a viewer from a user attribute storing section for storing the same, and a step of accumulating part or whole of the program according to the attribute information that is interpreted based on the meaning information and the user attributes, thereby achieving the above-described object.

It may further include a step of separating the program, the attribute information, and the meaning information received by the receiving section.

It may further include a step of receiving a program for executing the function of accumulating part or whole of the program and a step of executing the function of accumulating part or whole of the program based on the received program.

The step of receiving the program includes a step of receiving a broadcast and may further include a step of determining whether the reception of the program through the broadcast has failed or not and a step of acquiring the program through a network if it is determined that the reception of the program has failed.

It may further include a step of receiving the time of distribution of the program and a step of performing the operation of receiving the program at a point in time associated with the time of distribution.

BRIEF DESCRIPTION OF THE DRAWINGS

FIG. 6 is an illustration of meaning information according to the mode 1 for carrying out the invention.

FIG. 7 is an illustration of another piece of meaning information according to the mode 1 for carrying out the invention.

Figure 1:
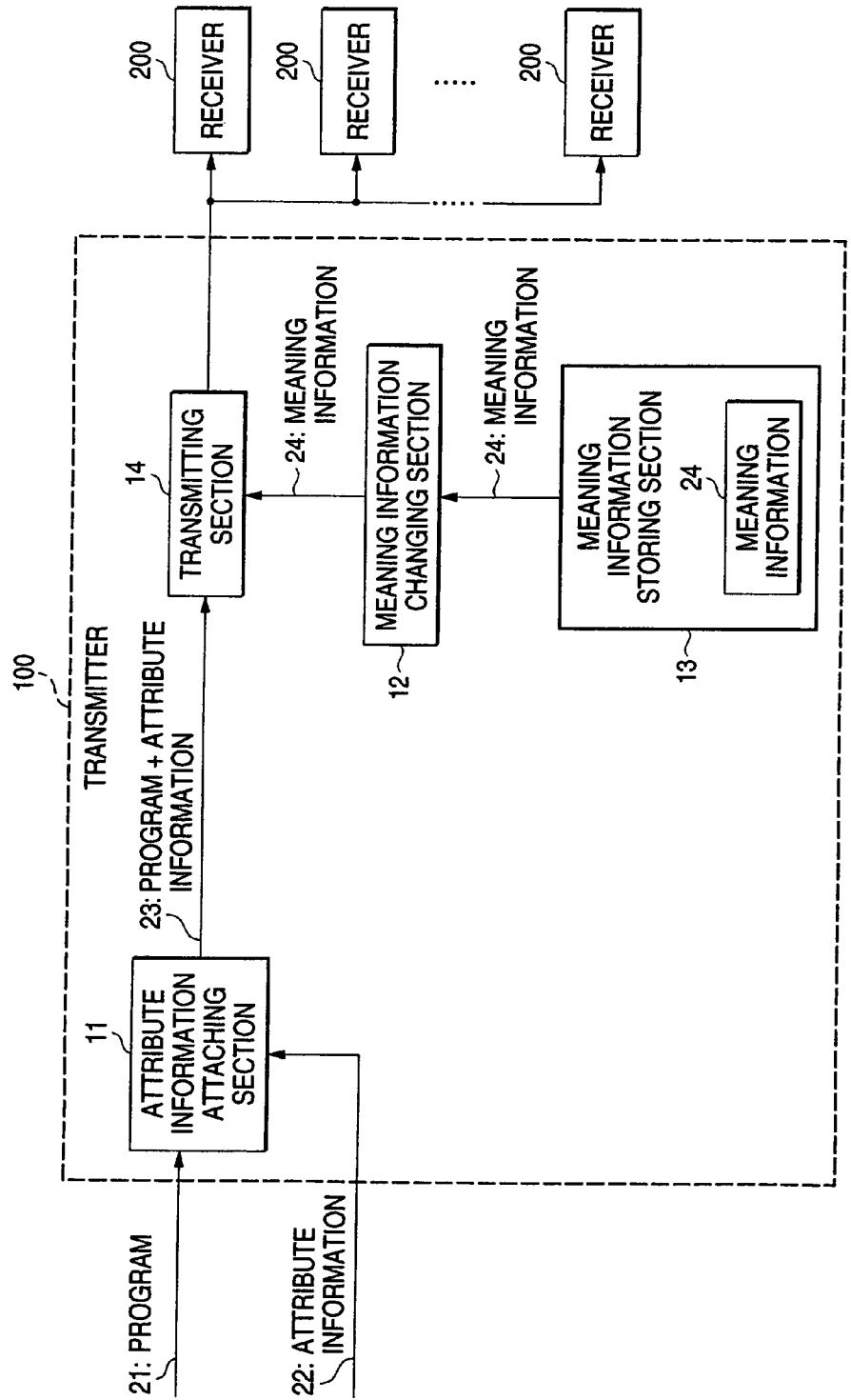
FIG. 1 is a block diagram of a transmitter according to a mode 1 for carrying out the invention.

Reference numbers 21, 22, 24, 100, and 200 in the drawings represent a program, attribute information, meaning information, a transmitter, and a receiver, respectively.

BEST MODES FOR CARRYING OUT THE INVENTION (Mode 1 for Carrying Out the Invention)

FIG. 1 is a block diagram of a transmitter according to a mode 1 for carrying out the invention. A transmission and reception system includes a transmitter 100 for transmitting program contents 21 and attribute information 22 of the program contents 21 and a receiver 200 for receiving the program contents 21 and accumulating part or whole of the program contents 21. The transmitter 100 has an attribute information attaching section 11, a meaning information changing section 12, a meaning information storing section 13, and a transmitting section 14. The transmitter 100 transmits meaning information 24 indicating the meaning and contents of the attribute information 22 in addition to the program contents 21 and attribute information 22.

Figure 2:
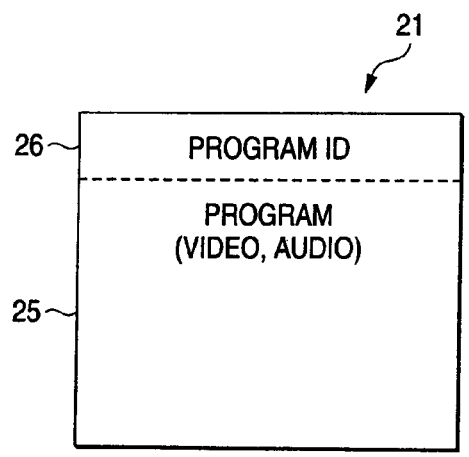
FIG. 2 is an illustration of a program before attribute information is attached thereto according to the mode 1 for carrying out the invention.
Figure 3:
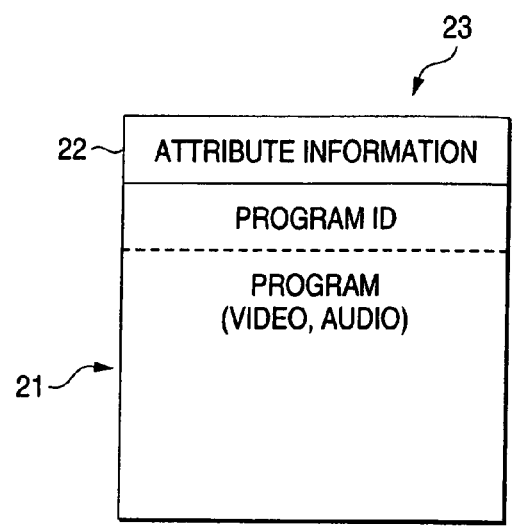
FIG. 3 is an illustration of the program after the attribute information is attached thereto according to the mode 1 for carrying out the invention.
Figure 4:
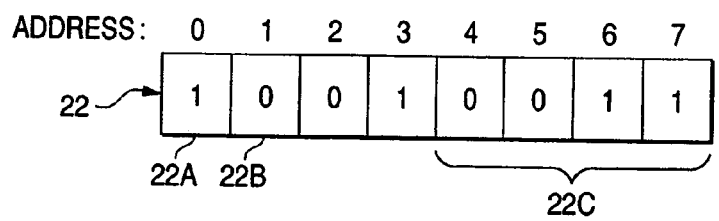
FIG. 4 is an illustration of the attribute information according to the mode 1 for carrying out the invention.

FIG. 2 is an illustration of the program contents 21 according to the mode 1 for carrying out the invention. FIG. 3 is an illustration of a program 23 after the attribute information 22 according to the mode 1 for carrying out the invention is attached thereto. FIG. 4 is an illustration of the attribute information 22 according to the model for carrying out the invention.

Referring to FIGS. 1, 2, 3, and 4, the attribute information attaching section 11 attaches the attribute information 22 to the program contents 21 input thereto to generate the program 23 which is in turn output to the transmitting section 14. The transmitting section 14 transmits the program 23 to the receiver 200.

The program contents 21 input to the attribute information attaching section 11 include a program 25 and a program ID 26. For example, the program 25 may include video information and audio information. The program ID 26 includes information for identifying the program 2S. The attribute information 22 represents the attributes of the program 25. For example, the attribute information 22 may be bit-string information of 8 bits as shown in FIG. 4, for example. The meaning information changing section 12 acquires the meaning information 24 stored in the meaning information storing section 13 and outputs it to the transmitting section 14. The transmitting section 14 transmits the meaning information 24 to the receiver 200.

FIG. 6 is an illustration of the meaning information 24 according to the mode 1 for carrying out the invention. The meaning information 24 indicates the meaning and contents of the above-described attribute information 22 in FIG. 4. The meaning information 24 represents the meaning and contents of the value of the bit in an n-th address of the attribute information 22. For example, in the example shown in FIG. 6, the meaning information 24 includes in formation 24A representing the meaning and contents of the value of the bit in an address 0 of the attribute information 22, meaning in formation 24B representing the meaning and contents of the value of the bit in an address 1 of the attribute information 22, and information 24C representing the meaning and contents of the values of the bits in addresses 4 through 7 of the attribute information 22. The meaning information 24 further includes the program ID 26 that identifies the program 25. One piece of meaning information of the attribute information may be represented by any number of bits as long as it is one bit or more.

Referring to the information 24A, a bit value "0" in the address 0 of the attribute information 22 indicates that the meaning and contents of the address 0 of the attribute information 22 are "a female", and a bit value "1" indicates that the meaning and contents of the address 0 of the attribute information 22 are "a male".

Referring to the information 24B, a bit value "0" in the address 1 of the attribute information 22 indicates that the meaning and contents of the address 1 of the attribute information 22 are "18 years of age or over ", and a bit value "1" indicates that the meaning and contents of the address 1 of the attribute information 22 are "no age limits".

The information 24C indicates the relationship between the values of the bits in the addresses 4 through 7 of the attribute information 22 and the meaning and contents of the addresses 4 through 7. Bit values "0001" in the addresses 4 through 7 indicate that the meaning and contents of the addresses 4 through 7 of the attribute information 22 are "A company"; bit values "0010" indicate that the meaning and contents of the addresses 4 through 7 are "B company"; bit values "0011" indicate that the meaning and contents of the addresses 4 through 7 are "T company"; and bit values "1111" indicate that the meaning and contents of the addresses 4 through 7 are "N company".

The meaning information transmitted by the transmitter 100 may be changed. Plural kinds of meaning information different from each other are stored in the meaning information storing section 13.

FIG. 7 is an illustration of meaning information 29 that is different from the meaning information 24 according to the mode 1 for carrying out the invention. The meaning information 29 represents the meaning and contents of the value of the bit in an n-th address of the attribute information 22. For example, in the example shown in FIG. 7, the meaning information 29 includes information 29A representing the meaning and contents of the value of the bit in the address 0 of the attribute information 22, meaning information 29B representing the meaning and contents of the values of the bits in the addresses 1 through 4, and meaning information 29C representing the meaning and contents of the value of the bit in the address 5. The meaning information 24 further includes the program ID 26 that identifies the program 25.

Referring to the information 29A, a bit value "0" in the address 0 of the attribute information 22 indicates that the meaning and contents of the address 1 of the attribute information 22 are "no age limits", and a bit value "1" indicates that the meaning and contents of the address 0 of the attribute information 22 are "18 years of age or over".

The information 29B indicates the relationship between the values of the bits in the addresses 1 through 4 of the attribute information 22 and the meaning and contents of the addresses 1 through 4. Bit values "0001" in the addresses 1 through 4 indicate that the meaning and contents of the addresses 1 through 4 of the attribute information 22 are "T company"; bit values "0010" indicate that the meaning and contents of the addresses 1 through 4 are "A company"; bit values "0011" indicates that the meaning and contents of the addresses 1 through 4 are "N company"; and bit values "1111" indicates that the meaning and contents of the addresses 1 through 4 are "B company".

Referring to the information 29C, a bit value "0" in the address 5 of the attribute information 22 indicates that the meaning and contents of the address 5 of the attribute information 22 are "a female", and a bit value "1" indicates that the meaning and contents of the address 5 of the attribute information 22 are "a male".

The meaning information 24 and the meaning information 29 that is different from the meaning information 24 maybe stored in the meaning information storing section 13. The meaning information 24 transmitted by the transmitter 100 may be changed to the meaning information 29. When the meaning information 24 is changed to the meaning information 29, new meanings may be added to the meaning information 29 including "fishing is his (or her) hobby" represented by a value "0" in the address 6 and "fishing is not his (or her) hobby" represented by a value "1", although only address changes are made in the figure. The meaning information 29 may exclude the meaning information written in the address 1 of the meaning information 24.

When the meaning information changing section 12 acquires the meaning information 24 from the meaning information storing section 13 and outputs it to the transmitting section 14, the transmitting section 14 transmits the meaning information 24 to the receiver 200. When the meaning information changing section 12 acquires the meaning information 29 from the meaning information storing section 13 and outputs it to the transmitting section 14, the transmitting section 14 transmits the meaning information 29 to the receiver 200. Thus, the meaning information transmitted by the transmitter 100 may be changed.

Figure 8:
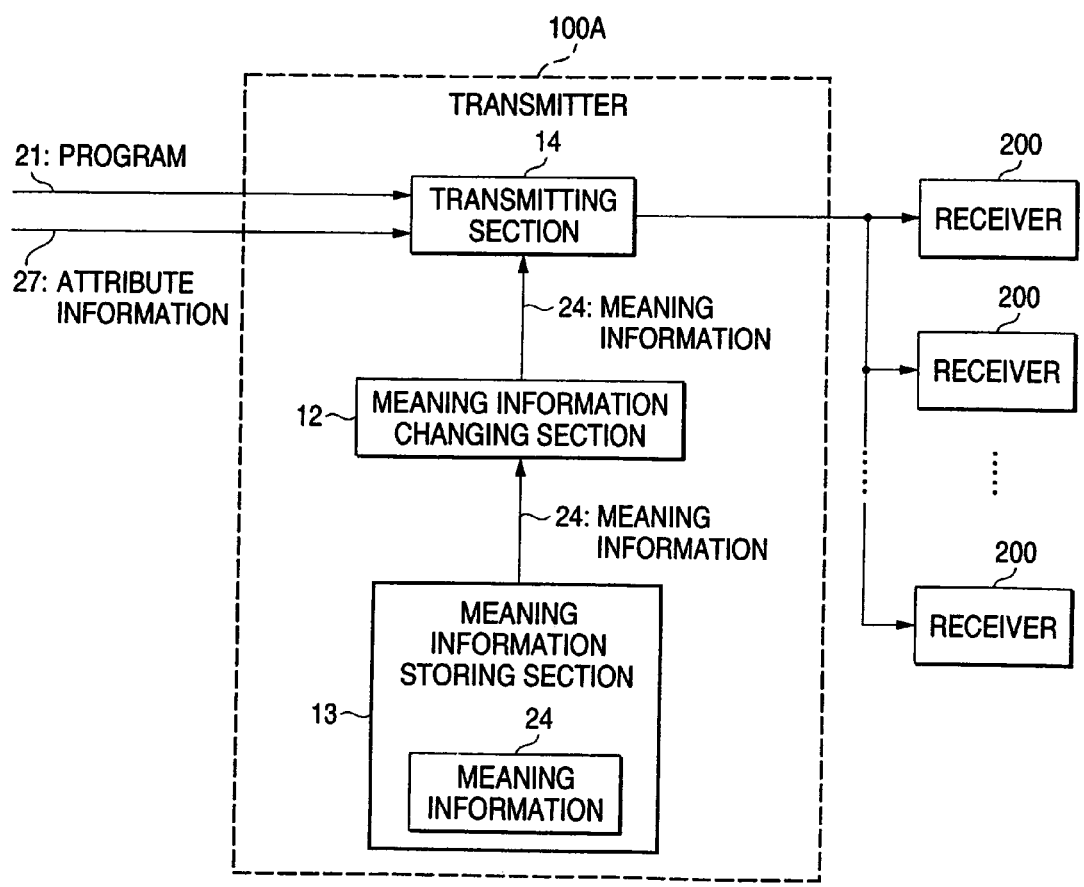
FIG. 8 is a block diagram of another transmitter according to the mode 1 for carrying out the invention.
Figure 9:
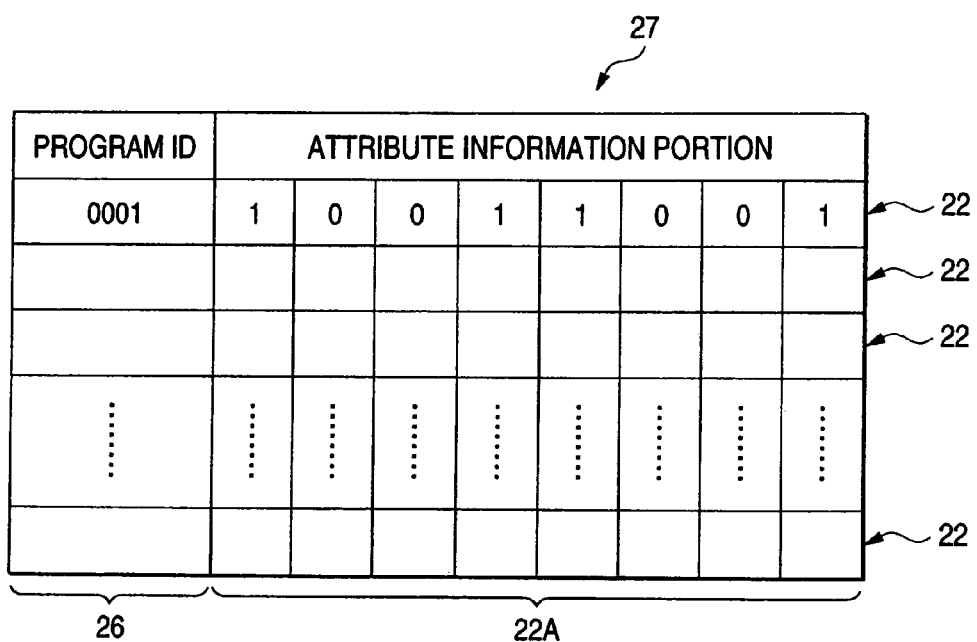
FIG. 9 is an illustration of another piece of attribute information according to the mode 1 for carrying out the invention.

FIG. 8 is a block diagram of another transmitter 100A according to the mode 1 for carrying out the invention. FIG. 9 is an illustration of another piece of attribute information 27 according to the mode 1 for carrying out the invention. Components that are identical to the above-described components are indicated by like reference numbers. Those components will not be described in detail.

Referring to FIG. 8, the transmitter 100A is different from the transmitter 100 in the mode 1 for carrying out the invention in that it transmits a program and attribute information separately. The transmitting section 14 transmits input program contents 21 to the receiver 200. The transmitting section 14 transmits input attribute information 27 to the receiver 200. Thus, the program contents 21 and attribute information 27 are separately transmitted.

Referring to FIG. 9, the attribute information 27 includes one or more pieces of information 22. Each piece of information 22 includes a program ID 26 and an attribute information portion 22A. For example, each attribute information portion 22A may be bit-string information of 8 bits in the attribute information 22 as described above with reference to FIG. 4. The relationship between the attribute information portions 22A and the meaning information 24 and 29 is the same as the relationship between the above-described attribute information portion 22 and the meaning information 24 and 29.

Figure 10:
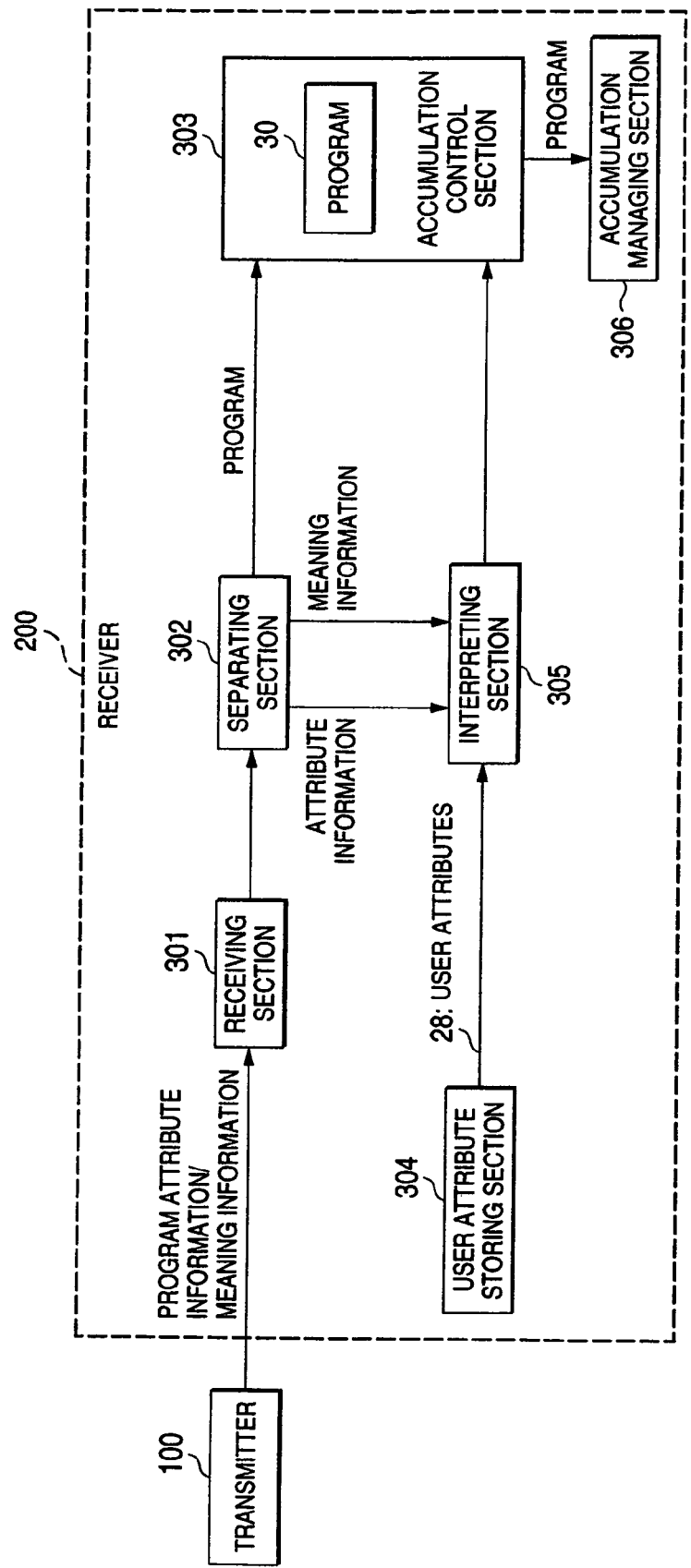
FIG. 10 is a block diagram of a receiver according to the mode 1 for carrying out the invention.

FIG. 10 is a block diagram of the receiver 200 according to the mode 1 for carrying out the invention. The receiver 200 has a receiving section 301 for receiving a program 23 including program contents 21 and attribute information 22 and meaning information 24, a separating section 302 for separating the program 23 received by the receiving section 301 into the program contents 21 and attribute information 22, a user attribute storing section 304 for storing user attributes 28 which are the attributes of a viewer, an interpreting section 305 for interpreting the attribute information 22 based on the meaning information 24, an accumulation control section 303 for accumulating part or whole of the program contents 21 according to the attribute information 22 that is interpreted based on the meaning information 24 and the user attributes 28, and an accumulation managing section 306 in which the part or whole of the program contents 21 is accumulated.

Figure 11:
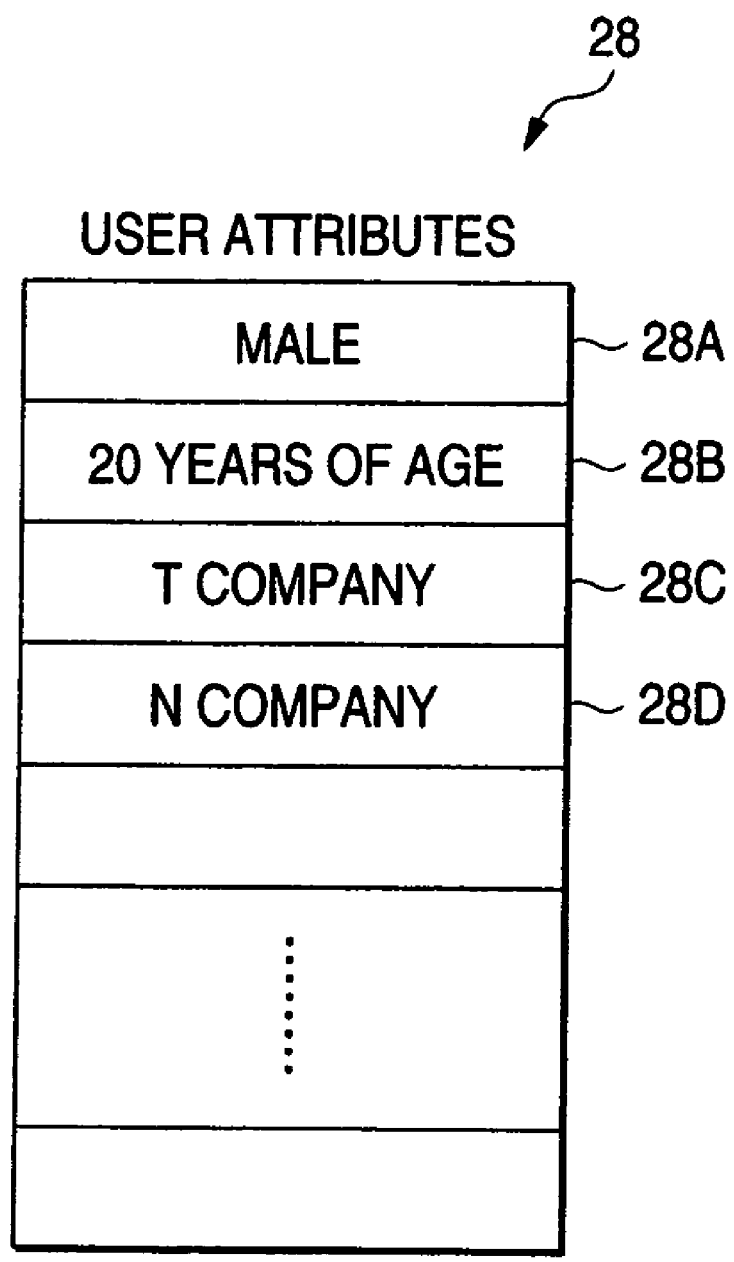
FIG. 11 is an illustration of user attributes according to the mode 1 for carrying out the invention.

FIG. 11 is an illustration of the user attributes 28 according to the mode 1 for carrying out the invention. The user attributes 28 indicate the attributes of a viewer who uses the receiver 200. The user attributes 28 are stored in the user attribute storing section 304 in advance. The user attributes 28 include information associated with the above-described meaning information 24 in FIG. 24. The user attributes 28 include one or more pieces of user attribute information 28A, 28B, 28C, 28D, . . . .

For example, in the example shown in FIG. 11, the user attribute information 28A may be information representing the sex of the viewer. The user attribute information 28A is collated with the above-described information 24A of the meaning information 24 in FIG. 6 to determine whether the condition is satisfied. In the example shown in FIG. 11, the user attribute information 28A indicates that the viewer is a male. The user attribute information 28B may be information representing the age of the viewer. In the example shown in FIG. 11, the user attribute information 28B indicates that the viewer is 20 years old. The user attribute information 28B is collated with the above-described information 24B in FIG. 6 to determine whether the condition is satisfied.

The user attribute information 28C and 28D may be information representing the name of a company that manufactures and sells a commodity or service used by the viewer. In the example shown in FIG. 11, the user attribute information 28C indicates that the viewer is a user of an automobile of T company. The user attribute information 28D indicates that the viewer is a user of an automobile of N company. The user attribute information 28C and 28D is collated with the above-described information 24C in FIG. 6 to determine whether the condition is satisfied.

Figure 12:
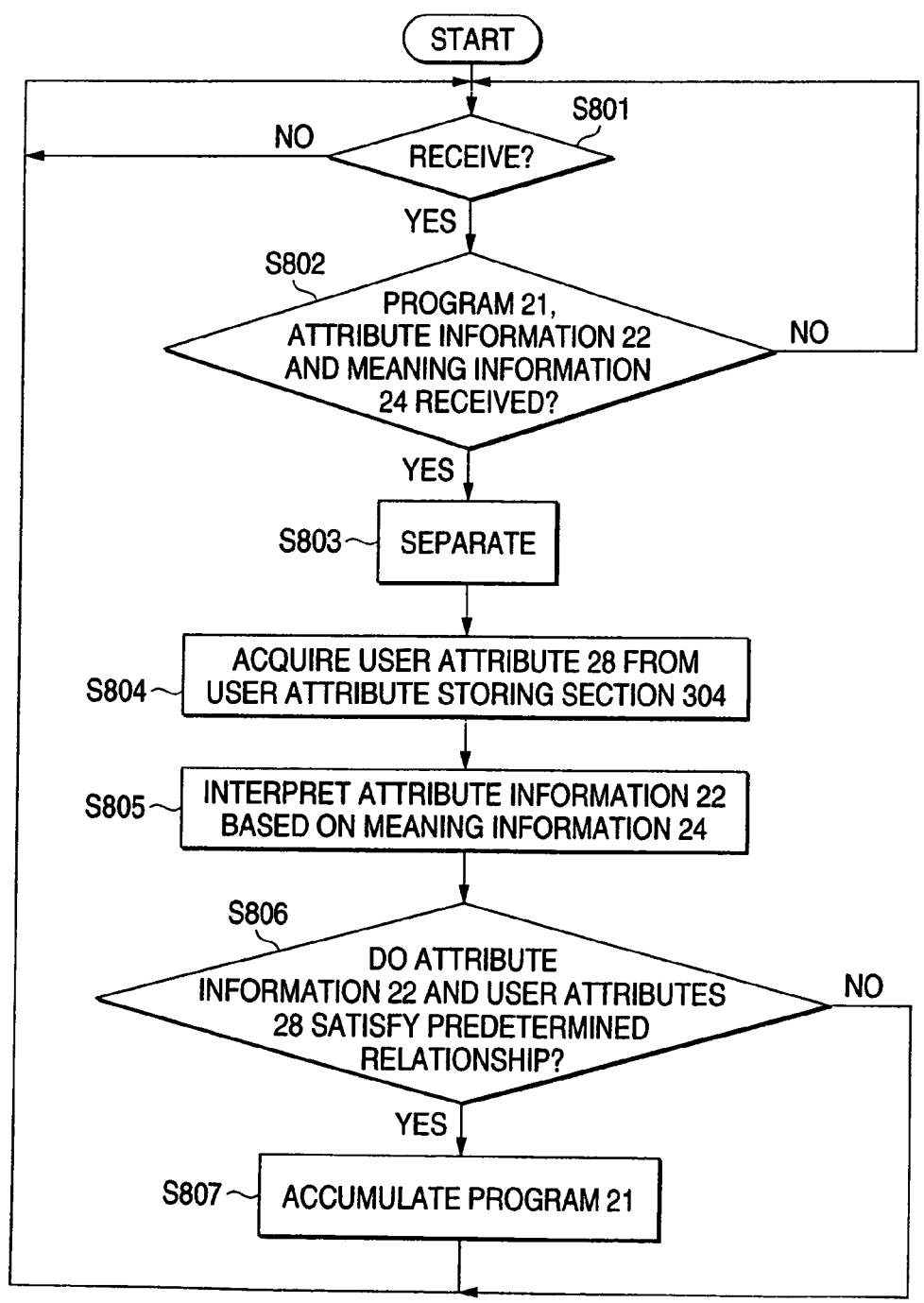
FIG. 12 is a flow chart that explains an operation of the receiver according to the mode 1 for carrying out the invention.

FIG. 12 is a flow chart that explains an operation of the receiver 200 according to the mode 1 for carrying out the invention. The receiving section 301 receives a program 23 including program contents 21 and attribute information 22 and meaning information 24 (S801). The separating section 302 separates the program 23 received by the receiving section 301 into the program contents 21 and attribute information 22, outputs the program contents 21 to the accumulation control section 303, and outputs the attribute information 22 and meaning information 24 to the interpreting section 305 (S802). The interpreting section 305 acquires user attributes 28 from the user attribute storing section 304 (S803).

The interpreting section 305 interprets the attribute information 22 based on the meaning information 24. In the example represented by the attribute information 22 in FIG. 4 and the meaning information 24 in FIG. 6, since the value of the bit in the address 0 of the attribute information 22 is 1 and the information 24A of the meaning information 24 indicates that the meaning and contents of the address 0 of the attribute information 22 are "a male" when value of the bit in the address 0 of the attribute information 22 is 1, the interpreting section 305 understands that the address 0 of the attribute information 22 means a fact that the viewer is "a male".

Similarly, since the value of the bit in the address 1 of the attribute information 22 is 0 and the information 24B of the meaning information 24 indicates that the meaning and contents of the address 1 of the attribute information 22 are "18 years of age or over" when the value of the bit in the address 1 of the attribute information 22 is 0, the interpreting section 305 understands that the address 1 of the attribute information 22 means a fact that the viewer is "18 years of age or over".

Since the values of the bits in the addresses 4 through 7 of the attribute information 22 are 0011 and the information 24C of the meaning information 24 indicates that the meaning and contents of the addresses 4 through 7 are "T company" when the values of the bits in the addresses 4 through 7 of the attribute information 22 are 0011, the interpreting section 305 understands that the addresses 4 through 7 of the attribute information 22 mean a fact that the viewer is a user of an automobile of "T company".

Thus, the interpreting section 305 understands that the attribute information 22 means a fact that the viewer is "a male" who is "18 years of age or over" and is a user of an automobile of "T company" based on the meaning information 24 (S804).

The interpreting section 305 determines whether the attribute information 22 and user attributes satisfy a predetermined relationship. The predetermined relationship means that the user attributes 28 satisfy all or part of conditions in the attribute information 22 that is interpreted based on the meaning information 24.

The interpreting section 305 can determine that the attribute information 22 and user attributes 28 satisfy the predetermined relationship when the user attributes 28 satisfy all of the conditions in the attribute information 22 (YES at S805).

For example, in the example represented by the attribute information 22 in FIG. 4, the meaning information 24 in FIG. 6, and the user attributes in FIG. 11, the interpreting section 305 determines that the attribute information 22 and user attributes 28 satisfy a predetermined relationship when the condition "a male" representing the meaning and contents of the address 0 of the attribute information 22 meets "a male" represented by the user attribute information 28A of the user attributes 28; the condition "18 years of age or over" representing the meaning and contents of the address 1 of the attribute information 22 meets "20 years of age" represented by the user attribute information 28B of the user attributes 28; and the condition "T company" representing the meaning and contents of the addresses 4 through 7 of the attribute information 22 meets "T company" represented by the user attribute information 28C of the user attributes 28.

While an example in which the user attributes 28 satisfy all of the conditions in the attribute information 22 has been presented, this is not limiting the present invention. The user attributes 28 may satisfy part of the conditions in the attribute information 22.

When the interpreting section 305 determines that the attribute information 22 and user attributes 28 satisfy the predetermined relationship (YES at S805), the accumulation control section 303 accumulates all or part of the program contents 21 in the accumulation managing section 306.

The accumulation control section 303 can accumulate all of the program contents 21 when the user attributes 28 satisfy all of the conditions in the attribute information 22. It can accumulate part of the program contents 21 when the user attributes 28 satisfy part of the conditions in the attribute information 22 and do not satisfy the rest.

For example, when the user attributes 28 do not satisfy the condition "18 years of age or over" in the attribute information 22, only audio information included in the program contents 21 may be accumulated.

For example, when the program contents 21 include a promotion video for A company and a main video from A company, only the promotion video included in the program contents 21 may be accumulated if the user attributes 28 do not satisfy the condition "A company" in the attribute information 22. If the user attributes 28 satisfy the condition "A company" in the attribute information 22, both of the promotion video and the main video included in the program contents 21 maybe accumulated.

When the accumulation control section 303 accumulates all or part of the program contents 21 in the accumulation managing section 306 (S806), if the interpreting section 305 determines that the attribute information 22 and the user attributes 28 do not satisfy the predetermined relationship (NO at S805), the process returns to S801.

As described above, the meaning information transmitted by the transmitter 100 may be changed. For example, the meaning information 24 shown in FIG. 6 may be changed to the meaning information 29 shown in FIG. 7.

When the meaning information 24 is changed to the meaning information 29, the attribute information 22 in FIG.

Figure 5:
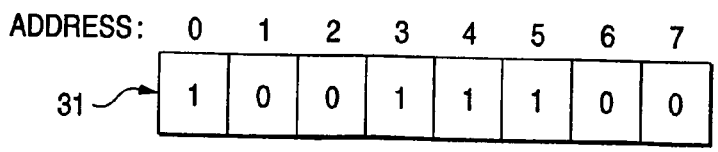
FIG. 5 is an illustration of another piece of attribute information according to the mode 1 for carrying out the invention.

4 representing "a male", "18 years of age", and "T company" is changed to the attribute information 31 shown in FIG. 5.

As described above, according to the mode 1 for carrying out the invention, since meaning information transmitted by the transmitter 100 can be changed, it is possible to provide a transmitter and a receiver capable of transmitting and receiving attribute information of a program while maintaining a high level of secrecy without a coding system.

According to the mode 1 for carrying out the invention, it is therefore possible to maintain secrecy of the intention of a transmission from a transmitter, i.e., the attributes of users for whom the transmission is intended.

While the mode 1 for carrying out the invention has shown an example wherein the meaning information is supplied from the transmitter to the receiver using a broadcast, this is not limiting the invention. The meaning information maybe supplied to the receiver through a network or maybe supplied to the receiver using recording media such as digital video disks and floppy disks.

When the meaning information is not supplied from the transmitter to the receiver using a broadcast, the transmitter 100 is not required to have the meaning information changing section 12 and meaning information storing section 13.

(Mode 2 for Carrying Out the Invention)

Figure 13:
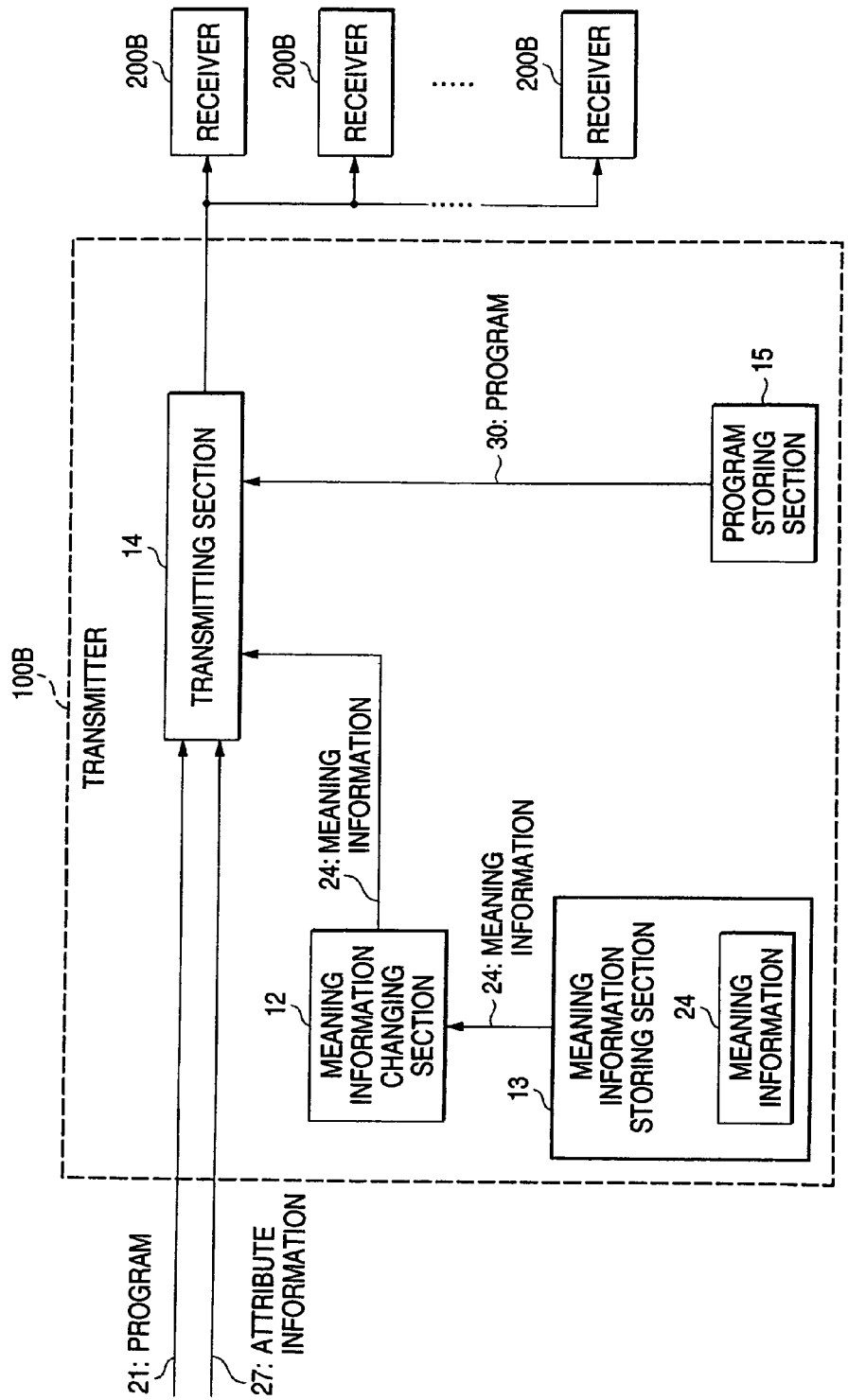
FIG. 13 is a block diagram of a transmitter according to a mode 2 for carrying out the invention.

FIG. 13 is a block diagram of a transmitter 100B according to a mode 2 for carrying out the invention. Components identical to the components described above in the mode 1 for carrying out the invention are indicated by like reference numbers. Those components will not be described in detail.

It is different from the mode 1 for carrying out the invention in that the transmitter 100B transmits a program 30 that allows a receiver 200B to execute a function of accumulating part or whole of a program. The transmitter 100B further has a program storing section 15 for storing the program 30. A transmitting section 14 transmits the program 30 to the receiver 200B.

Figure 14:
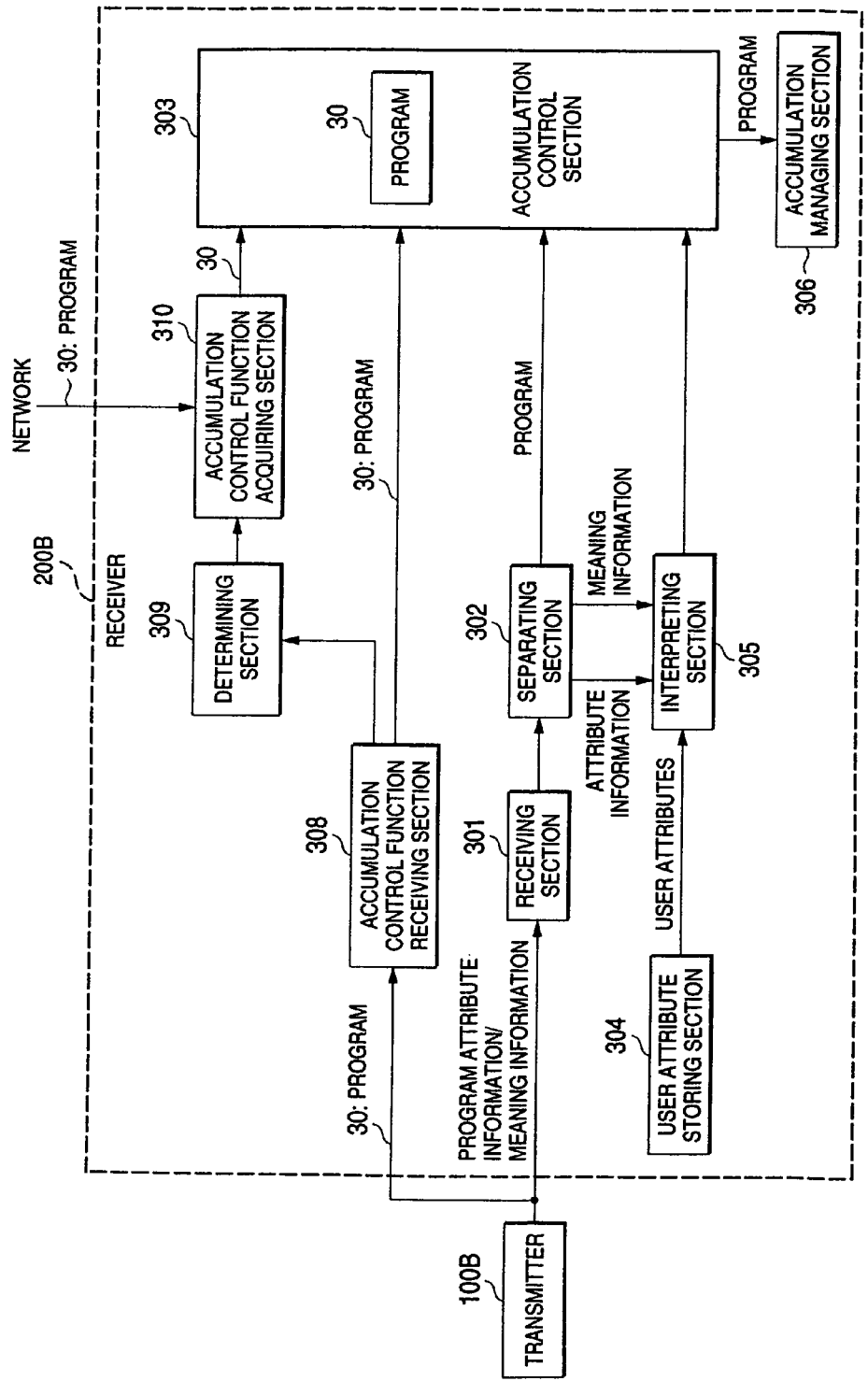
FIG. 14 is a block diagram of a receiver according to the mode 2 for carrying out the invention.

FIG. 14 is a block diagram of the receiver 200B according to the mode 2 for carrying out the invention. Components identical to the components described above in the mode 1 for carrying out the invention are indicated by like reference numbers. Those components will not be described in detail.

It is different from the mode 1 for carrying out the invention in that the receiver 200B further receives the program 30. The receiver 200B further has an accumulation control function receiving section 308 for receiving the program 30 from the transmitter 100B.

The receiver 200B further has a determining section 309 for determining whether the accumulation control function receiving section 308 has failed to receive the program 30 from the transmitter 100B or not and an accumulation control function acquiring section 310 for acquiring the program 30 through a network when the determining section 309 determines that the reception of the program 30 has failed.

Figure 15:
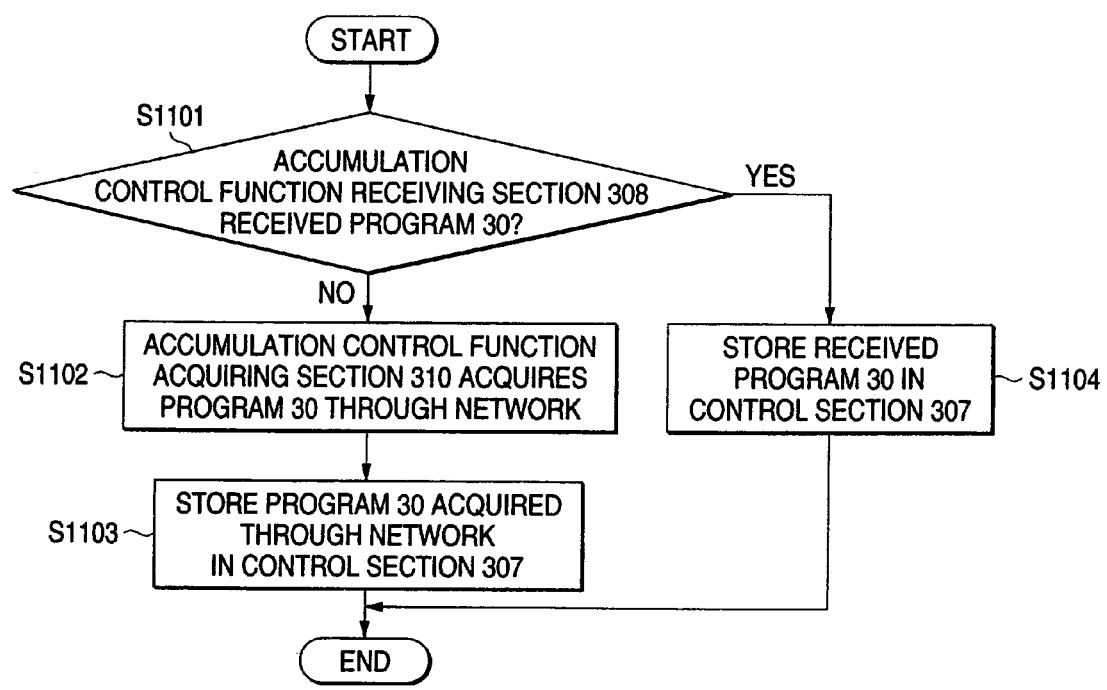
FIG. 15 is a flow chart that explains an operation of the receiver according to the mode 2 for carrying out the invention.

FIG. 15 is a flow chart that explains an operation of the receiver 200B according to the mode 2 for carrying out the invention. The determining section 309 determines whether the accumulation control function receiving section 308 has failed to receive the program 30 from the transmitter 100B or not (S1101) If it is determined that the accumulation control function receiving section 308 has failed to receive the program 30 from the transmitter 100B (NO at S1101), the accumulation control function acquiring section 310 acquires the program 30 through a network (S1102). A control section 307 stores the program 30 acquired by the accumulation control function acquiring section 310 through a network in a memory that is not shown (S1103). An accumulation control section 303 operates based on the program 30 stored in the memory of the control section 307.

If it is determined that the accumulation control function receiving section 308 could receive the program 30 from the transmitter 100B (YES at S1101), the control section 307 stores the program 30 received by the accumulation control function receiving section 308 in a memory that is not shown. The accumulation control section 303 operates based on the program 30 stored in the memory of the control section 307.

Although an example has been described in which the accumulation control function receiving section 308 is separated from a receiving section 301, this is not limiting the invention. The accumulation control function receiving section 308 and receiving section 301 may be integrally configured, and the program 30 may be separated by a separating section 302 into a program, attribute information, and meaning information.

As describe above, according to the mode 2 for carrying out the invention, the program 30 for executing the function of accumulating part or whole of a program can be acquired through a broadcast or network.

The receiver 200B is always connected to a network. Since a network has a lower error rate and higher reliability compared to a broadcast, the receiver 200B can reliably acquire the program 30 through a network.

(Mode 3 for Carrying Out the Invention)

Figure 16:
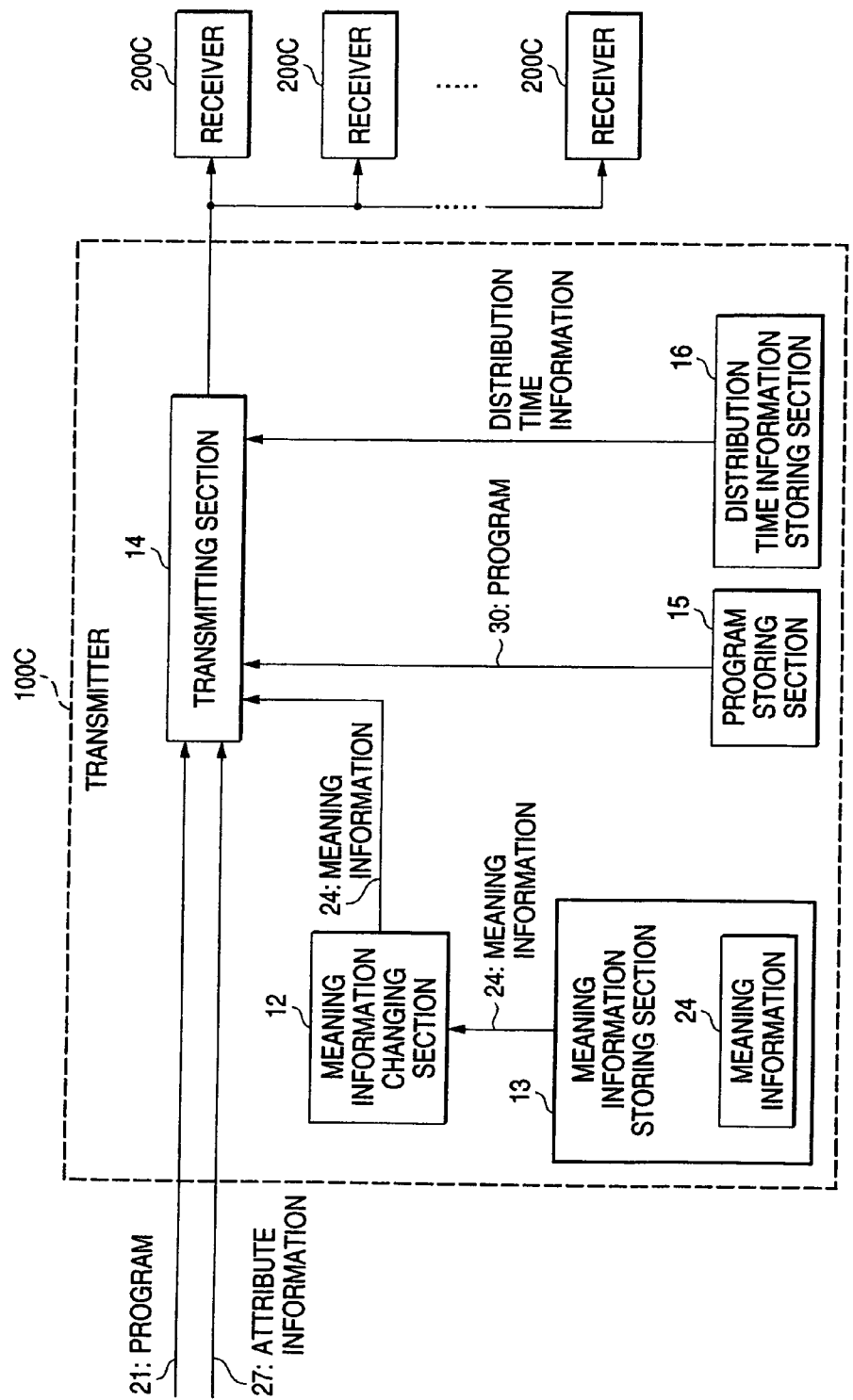
FIG. 16 is a block diagram of a transmitter according to a mode 3 for carrying out the invention.

FIG. 16 is a block diagram of a transmitter 100C according to a mode 3 for carrying out the invention. Components identical to the components described above in the mode 2 for carrying out the invention are indicated by like reference numbers. Those components will not be described in detail.

It is different from the mode 2 for carrying out the invention in that the transmitter 100C further transmits the information of the distribution time of the program 30. The transmitter 100C further has a distribution time storing section 16 for storing the distribution time information of the program 30. A transmitting section 14 transmits the distribution time information to a receiver 200C.

Figure 17:
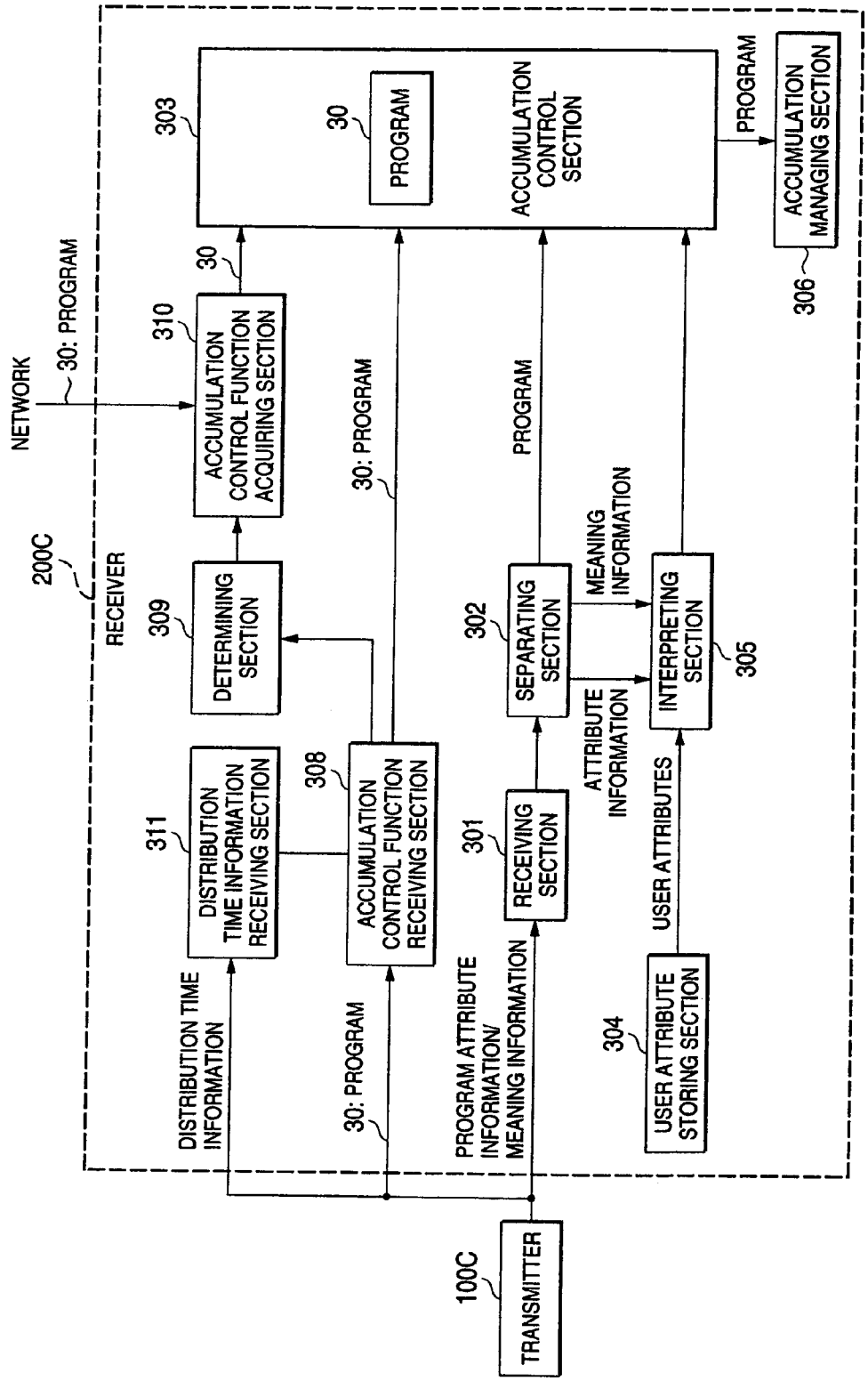
FIG. 17 is a block diagram of a receiver according to the mode 3 for carrying out the invention.

FIG. 17 is a block diagram of the receiver 200C according to the mode 3 for carrying out the invention. Components identical to the components described above in the mode 2 for carrying out the invention are indicated by like reference numbers. Those components will not be described in detail.

It is different from the mode 2 for carrying out the invention in that the receiver 200C further receives the distribution time information from the transmitter 100C. The receiver 200C further has a distribution time receiving section 311 for receiving the distribution time information of the program 30.

Figure 18:
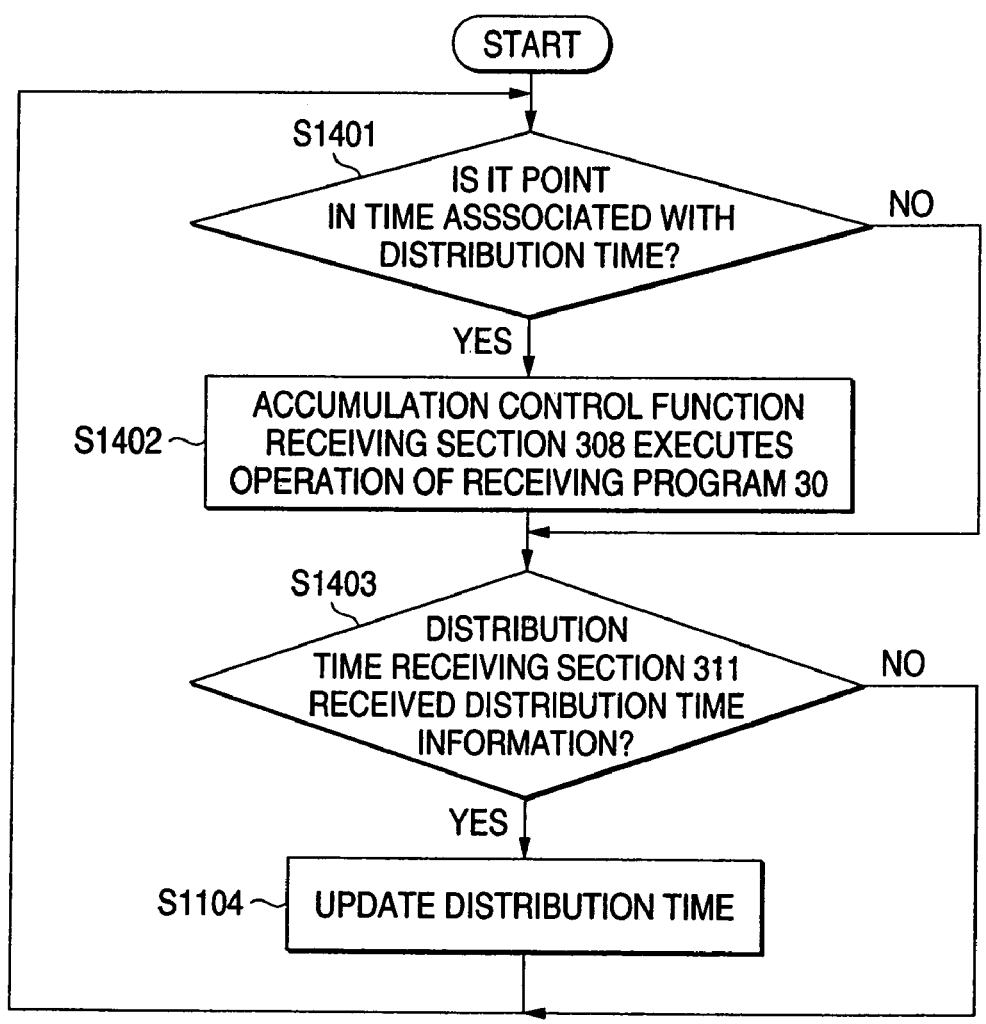
FIG. 18 is a flow chart that explains an operation of the receiver according to the mode 3 for carrying out the invention.

FIG. 18 is a flow chart that explains an operation of the receiver 200C according to the mode 3 for carrying out the invention. The distribution time receiving section 311 determines whether it is a point in time associated with the distribution time of the program 30 (S1401). The point in time associated with the distribution time may be the point in time five minutes before the distribution time. If the distribution time receiving section 311 determines that it is a point in time associated with the distribution time of the program 30 (YES at S1401), an accumulation control function receiving section 308 executes an operation of receiving the program 30 (S1402)

The receiver 200C transfers from a standby state in which it operates on an auxiliary power source (not shown) to an operating state in which it operates on a main power supply (not shown), and the accumulation control function receiving section 308 executes the operation of receiving the program 30. When the execution of the operation of receiving the program 30 is finished, the receiver 200C returns to the standby state in which it operates on the auxiliary power source.

When the accumulation control function receiving section 308 executes the operation of receiving the program 30 (S1402) or determines that it is not a point in time associated with the distribution time of the program 30 (NO at S1401), the distribution time receiving section 311 determines whether distribution time information has been received from the transmitter 100C (S1403). If it is determined that distribution time information has been received from the transmitter 100C (YES at S1403), the distribution time receiving section 311 updates the distribution time based on the received distribution time information (S1404).

When the distribution time receiving section 311 updates the distribution time (S1404) or determines that no distribution time information has been received from the transmitter 100C (NO at S1403), the process returns to S1401.

Although an example has been described in which the accumulation control function receiving section 308 is separated from a receiving section 301 similarly to the mode 2 for carrying out the invention, this is not limiting the invention. The accumulation control function receiving section 308 and receiving section 301 may be integrally configured, and a separating section 302 may separate the program 30 into a program, attribute information, and meaning information.

Although an example has been described in which the distribution time receiving section 311 is separated form the receiving section 301, this is not limiting the invention. The distribution time receiving section 311 and receiving section 301 may be integrally configured.

As described above, according to the mode 3 for carrying out the invention, the program 30 can be transmitted from the transmitter 100C to the receiver 200C in a time zone such as mid night when a small number of programs are transmitted. Further, the receiver 200C may be automatically activated when the program 30 is transmitted.

INDUSTRIAL APPLICABILITY

As described above, the present invention makes it possible to provide a transmitter and a receiver capable of transmitting and receiving attribute information of a program while maintaining a high level of secrecy without using a coding system.

The invention claimed is:

1. A receiver comprising:
  a receiving section for receiving a program, attribute information of said program, and meaning information indicating the meaning and contents of said attribute information,
  a user attribute storing section for storing user attributes that are attributes of a viewer,
  an accumulation control section for storing part or whole of said program according to said attribute information that is interpreted based on said meaning information and said user attributes,
  an accumulation control function receiving section for receiving a function program for executing a function of accumulating part or whole of said program and in that said accumulation control section operates based on said function program received by said accumulation control function receiving section, and
  wherein the means of said accumulation control function receiving section for receiving said function program is means for receiving a broadcast, the receiver further having a determining section for determining whether said accumulation control function receiving section has failed to receive said function program from said broadcast or not and an accumulation control function acquiring section for acquiring said function program through a network when said determining section determines that the reception has failed.

2. A receiver according to claim 1, further having a separating section for separating said program, said attribute information, and said meaning information received by said receiving section.

3. A receiver according to claim 1, further having a distribution time receiving section for receiving the time of distribution of said function program, wherein said accumulation control function receiving section performs the receiving operation at a point in time associated with said distribution time.

4. A method of reception including
  a step of receiving a program, attribute information of said program, and meaning information indicating the meaning and contents of said attribute information,
  a step of acquiring user attributes that are the attributes of a viewer from a user attribute storing section for storing the same, and
  a step of storing part or whole of said program according to said attribute information that is interpreted based on said meaning information and said user attributes.

5. A method of reception according to claim 4 further including a step of separating said program, said attribute information, and said meaning information received by said receiving section.

6. A method of reception according to claim 4, further including a step of receiving the time of distribution of said function program and a step of performing the operation of receiving said function program at a point in time associated with said distribution time,
  a step of receiving a function program for executing a function of accumulating part or whole of said program and a step of executing the function of accumulating part or whole of said program based on said received function program, and
  wherein the step of receiving said function program further includes a step of receiving a broadcast, said method further including a step of determining whether the reception of said function program from said broadcast has failed or not and a step of acquiring said function program through a network when it is determined that the reception of said function program has failed.

* * * * *

UNITED STATES PATENT AND TRADEMARK OFFICE
CERTIFICATE OF CORRECTION

| | | |
|---|---|---|
| PATENT NO. | : 7,039,396 B2 | Page 1 of 1 |
| APPLICATION NO. | : 09/913360 | |
| DATED | : May 2, 2006 | |
| INVENTOR(S) | : Hiroyuki Nishi and Yasuo Endo | |

It is certified that error appears in the above-identified patent and that said Letters Patent is hereby corrected as shown below:

In column 12, claim 4, line 34, please delete the word "and"

In column 12, claim 4, line 37, after the word "attributes", please insert the following text:

> -- a step of receiving a function program for executing a function of accumulating part or whole of said program and a step of executing the function of accumulating part or whole of said program based on said received function program, and
>
> wherein the step of receiving said function program further includes a step of receiving a broadcast, said method further including a step of determining whether the reception of said function program from said broadcast has failed or not and a step of acquiring said function program through a network when it is determined that the reception of said function program has failed--

In column 12, claim 6, line 47, after the word "time", please delete the following text:

> "a step of receiving a function program for executing a function of accumulating part or whole of said program and a step of executing the function of accumulating part or whole of said program based on said received function program, and
>
> wherein the step of receiving said function program further includes a step of receiving a broadcast, said method further including a step of determining whether the reception of said function program from said broadcast has failed or not and a step of acquiring said function program through a network when it is determined that the reception of said function program has failed"

Signed and Sealed this

Twenty-eighth Day of August, 2007

JON W. DUDAS
*Director of the United States Patent and Trademark Office*